(12) United States Patent
Xhakoni et al.

(10) Patent No.: US 11,653,115 B2
(45) Date of Patent: May 16, 2023

(54) IMAGE SENSOR SYSTEM, ELECTRONIC DEVICE AND METHOD FOR OPERATING AN IMAGE SENSOR

(71) Applicant: ams Sensors Belgium BVBA, Antwerp (BE)

(72) Inventors: Adi Xhakoni, Antwerp (BE); Ali Jaderi, Antwerp (BE); Guy Meynants, Antwerp (BE)

(73) Assignee: AMS SENSORS BELGIUM BVBA, Antwerp (BE)

( * ) Notice: Subject to any disclaimer, the term of this patent is extended or adjusted under 35 U.S.C. 154(b) by 0 days.

(21) Appl. No.: 17/429,709

(22) PCT Filed: Jan. 23, 2020

(86) PCT No.: PCT/EP2020/051638
§ 371 (c)(1),
(2) Date: Aug. 10, 2021

(87) PCT Pub. No.: WO2020/164880
PCT Pub. Date: Aug. 20, 2020

(65) Prior Publication Data
US 2022/0132061 A1 Apr. 28, 2022

(30) Foreign Application Priority Data
Feb. 12, 2019 (EP) .................................. 19156690

(51) Int. Cl.
*H04N 5/369* (2011.01)
*H04N 5/3745* (2011.01)

(52) U.S. Cl.
CPC ....... *H04N 5/36963* (2018.08); *H04N 5/3698* (2013.01); *H04N 5/37455* (2013.01)

(58) Field of Classification Search
CPC ............. H04N 5/36963; H04N 5/3698; H04N 5/37455; H04N 5/361
(Continued)

(56) References Cited

U.S. PATENT DOCUMENTS

| 2008/0291290 A1* | 11/2008 | Sonoda | H04N 5/361 348/222.1 |
| 2013/0182934 A1* | 7/2013 | Topfer | G06V 10/30 382/132 |

FOREIGN PATENT DOCUMENTS

| JP | 2016100806 A | 5/2016 |
| JP | 2016100806 | * 10/2018 |
| WO | 2010100574 A1 | 9/2010 |

OTHER PUBLICATIONS

S. Kawahito, "Signal Processing Architectures for Low-Noise High-Resolution CMOS Image Sensors", IEEE 2007 Custom Intergrated Circuits Conference (CICC), 2007, pp. 695-702.
(Continued)

*Primary Examiner* — Lin Ye
*Assistant Examiner* — Chan T Nguyen
(74) *Attorney, Agent, or Firm* — MH2 Technology Law Group, LLP

(57) ABSTRACT

An image sensor system has a pixel array with a plurality of pixels, each of the pixels comprising a photodiode, a pixel buffer and a transfer gate coupled between the photodiode and an input of the pixel buffer. A voltage supply block is configured to generate a pixel supply voltage from an input voltage based on a first reference voltage and to provide the pixel supply voltage to the pixel array. A calibration processing block is configured to determine an average pixel signal based on an average of individual pixel signals at outputs of the pixels of the pixel array and to determine a correction value based on the average pixel signal and a reference pixel signal. A correction processing block is
(Continued)

configured to determine the first reference voltage based on a combination of a second reference voltage and the correction value.

13 Claims, 2 Drawing Sheets

(58) Field of Classification Search
USPC .......................................................... 348/294
See application file for complete search history.

(56) References Cited

OTHER PUBLICATIONS

International Search Report and Written Opinion in corresponding International Application No. PCT/EP2020/051638 dated Feb. 26, 2020, 11 pages.

\* cited by examiner

IMAGE SENSOR SYSTEM, ELECTRONIC DEVICE AND METHOD FOR OPERATING AN IMAGE SENSOR

CROSS-REFERENCE TO RELATED APPLICATIONS

The present application is the national stage entry of International Patent Application No. PCT/EP2020/051638, filed on Jan. 23, 2020, and published as WO 2020/164880 A1 on Aug. 20, 2020, which claims the benefit of priority of European Patent Application No. 19156690.0, filed on Feb. 12, 2019, all of which are incorporated by reference herein in their entirety.

FIELD OF THE INVENTION

The present disclosure relates to an image sensor system, to an electronic device with a camera system comprising such an image sensor system and to a method for operating an image sensor.

BACKGROUND OF THE INVENTION

CMOS image sensors, CIS, usually comprise an array of unit elements, called pixels. The array of pixels is exposed to radiation during an exposure period and, subsequently, the signal value of each pixel is read from the array.

The readout process is generally subject to process, voltage and temperature, PVT, variations. Due to such variations for example the overall sensitivity of the image sensor is reduced.

An objective to be achieved is to provide an improved concept for reading out a pixel array of an image sensor with improved performance.

This objective is achieved with the subject matter of the independent claims. Embodiments and developments of the improved concept are defined in the dependent claims.

SUMMARY OF THE INVENTION

A pixel array may have a plurality of pixels, wherein each of the pixels comprises a photodiode, a pixel buffer, for example a source follower, and a transfer gate coupled between the photodiode and an input of the pixel buffer. The improved concept is based on the idea that in such pixel, array PVT variations within the pixel or the pixel readout circuitry, respectively, can be taken into account by varying a supply voltage for the pixel array. For example, the supply voltage is varied to achieve, on average, a defined output level of output signals of the pixels of the pixel array. For example, an average of individual pixel signals at the outputs of the pixels of the pixel array are determined and compared to a reference pixel signal in order to determine a correction value, which forms the basis of adapting a supply voltage. For instance, the correction value corresponds to a difference between the average and the reference pixel signal or to a value derived thereof. Hence, variations in the signal levels of the pixel are compensated by adjusting the supply voltage of the pixel array using a negative feedback loop.

As only a common supply for the pixel array has to be adjusted and/or controlled, an image sensor system can be provided with a higher power efficiency and less area needed for implementation. Also, operation speed of the image sensor system can be increased due to less effort needed to control voltages within the pixel array.

An embodiment of an image sensor system according to the improved concept comprises a pixel array with a plurality of pixels, wherein each of the pixels comprises a photodiode, a pixel buffer and a transfer gate coupled between the photodiode and an input of the pixel buffer. A voltage supply block of the image sensor system is configured to generate a pixel supply voltage from an input voltage based on a first reference voltage and to provide the pixel supply voltage to the pixel array. The image sensor system further comprises a calibration processing block configured to determine an average pixel signal based on an average of individual pixel signals at outputs of the pixels of the pixel array and to determine a correction value based on the average pixel signal and a reference pixel signal. A correction processing block is configured to determine the first reference voltage based on a combination of a second reference voltage and the correction value.

For instance, the correction value is determined as a difference between the average pixel signal and the reference pixel signal or to a value derived from said difference.

In some implementations of pixels, a select switch may further be present between an output of the pixel buffer and the calibration processing block.

The pixel buffer may be implemented as a pixel source follower, e.g. implemented as a field-effect transistor. The photodiode of the pixel is connected to the gate or control input of the pixel buffer via the associated transfer gate and hence controls the pixel buffer depending on the output signal of the photodiode. A threshold voltage of the pixel buffer may be subject to variation over corners due to PVT variations. Hence, the output voltage of the pixel, in particular at a dark level or reset level, can vary substantially because of this. This can reduce the voltage swing at the output of the pixel and therefore, from an overall perspective, the dynamic range and/or sensitivity of the sensor.

Hence, in various implementations of the image sensor system, the individual pixel signals are dark level signals and/or reset level signals of the pixels of the pixel array. For example, a dark level signal represents a signal output by a pixel when no light is incident on the photodiode or at least no signal is transferred from the photodiode to the pixel buffer. A reset level signal may be established by selectively connecting the input of the pixel buffer to the supply voltage, for example with a reset switch.

Generally speaking, in some implementations the inputs of the pixel buffers of the pixel array are connected to an array supply terminal, at which the pixel supply voltage is provided via associated reset switches. The reset level or dark level may be used as a reference for a pixel signal corresponding to light incident on the photodiode.

In such implementations, the pixel buffer may be supplied via the same pixel supply voltage or via a different, independent supply voltage which e.g. does not undergo a correction based on the correction value.

In some implementations with the reset switches, the correction processing block may be further configured to adjust, based on the correction value, a control signal for controlling the reset switches, in particular a high level of the controlled signal. For example, if the pixel supply voltage to be switched via the reset switches is higher, also a high level of the reset pulse that controls the reset switch in the pixel is adjusted to be stronger. However, since the amount of voltage that needs to be added or subtracted is the same for both, an added complexity is negligible.

In various implementations, the image sensor system further comprises a storage element which can be some kind of RAM or other volatile memory, or a non-volatile memory like a one-time programmable, OTP, memory or flash memory. The calibration processing block is configured to store the determined correction value into the storage element, and the correction processing block is configured to retrieve the correction value from the storage element. This allows that the correction value does not have to be determined continuously but may be determined only once or only at specific time instances during operation of the image sensor system. At startup of the image sensor, e.g. prior to any calibration, the correction value may be or set equal to 0 to be able to provide an initial voltage supply to the pixels. For example, if the correction value represents a voltage value, it can be initially set to 0 V for this purpose.

In various applications, the pixels of the pixel array are used for producing output signals of the image sensor system. In other words, the pixels are used to sense incident light.

However, in some implementations, the pixel array is a dummy pixel array and the pixels of the dummy pixel array are shielded against incident light. The image sensor system further comprises a further pixel array, which may be an active pixel array, with a plurality of further pixels, each of the further pixels comprising a photodiode, a pixel buffer and a transfer gate coupled between the photodiode and an input of the pixel buffer of the respective further pixel. Each of the further pixels is configured to sense the incident light. The voltage supply block is configured to provide the pixel supply voltage to the dummy pixel array and to the further pixel array respectively active pixel array.

For example, the pixels of the dummy pixel array and of the active pixel array have the same or at least a similar structure, such that they are subject to the same PVT variations during operation of the image sensor system. Hence, through the provision of the dummy pixel array and the shielding of the dummy pixel array against incident light, it can be guaranteed that only dark level signals are taken into account for determining the average pixel signal and the correction value, respectively.

The shielding for example is performed with an opaque or metal shielding, e.g. a metal layer arranged in the light path of incident light. The pixels of the dummy pixel array can also be called optically black pixels.

In some implementations the image sensor system further comprises an analog-to-digital converter, ADC, which is coupled to outputs of the pixels of the pixel array. The reference pixel signal is dependent on an input characteristic of the ADC, for example an input voltage range of the ADC. Hence, by adjusting the pixel supply voltage, a dynamic range of the ADC, i.e. the input voltage range of the ADC, is matched with an output swing of the pixel. This can make a column amplifier of conventional image sensors with pixel arrays unnecessary.

In the various implementations of the image sensor system, the average on which the determination of the average pixel signal is based, is for example a mean value, e.g. an arithmetic mean value, a median value or a midrange value. Using a mean value, in particular an arithmetic mean value, takes into account all of the signals provided by the pixels of the pixel array. This may also include signals from defective pixels which do not actually send a desired signal level. Using the median value neglects such defective pixel values.

In various implementations, the image sensor system includes an image sensor, which comprises the pixel array, the voltage supply block and the correction processing block, and further includes the calibration processing block being integrated with the image sensor or being provided externally to the image sensor.

If the calibration processing block is integrated with the image sensor, calibration, i.e. determination of an actual correction value can be performed at arbitrary times. For example, the calibration can be performed at start-up of the image sensor, or at distinct time intervals that are predefined or adjusted depending on a rate of change of the PVT variations. To this end, the feedback loop with the calibration processing block and the correction processing block can be implemented in such a way that they can easily be enabled or disabled.

If the correction processing block is provided externally to the image sensor, the correction value may be determined only once, for example during an initial calibration, wherein the so determined correction value is stored in a storage element of the image sensor, e.g. a non-volatile memory like an OTP memory as described above. The external processing has the positive effect that less of the feedback circuitry has to be implemented with the image sensor, resulting in a higher power efficiency and less area needed for implementation.

The processing can be performed in the analog domain, in the digital domain or in a combination thereof. For example, the individual pixel signals are digitally converted and processed in the digital domain.

An image sensor system according to one of the implementations described above can be used in a camera system of various electronic devices, for example.

Such electronic devices may include smartphones, tablet computers, portable computers and the like, but also larger devices such as personal computers and/or their displays. Electronic devices further include devices for machine vision, photo or video cameras or smart watches and other wearables. Generally, an image sensor system according to one of the implementations described above can be used in all imaging applications which use active pixels.

In another aspect, a method for operating an image sensor according to the improved concept is proposed, wherein the image sensor comprises a pixel array with a plurality of pixels, each of the pixels comprising a photodiode, a pixel buffer and a transfer gate coupled between the photodiode and an input of the pixel buffer. The image sensor further comprises a voltage supply block configured to generate a pixel supply voltage from an input voltage based on a first reference voltage and to provide the pixel supply voltage to the pixel array. The method comprises, during a calibration mode of operation, determining an average pixel signal based on an average of individual pixel signals at outputs of the pixels of the pixel array and determining a correction value based on the average pixel signal and the reference pixel signal. The method further comprises determining the first reference voltage based on a combination of a second reference voltage and the correction value.

For example, during the calibration mode of operation, the correction value is stored into a storage element of the image sensor. Determining the first reference value comprises retrieving the correction value from the storage element.

As discussed for the various implementations of the image sensor system, the individual pixel signals may be dark level signals and/or reset level signals of the pixels of the pixel array. For example, the inputs of the pixel buffers of the pixel array are connected to an array supply terminal, at which the pixel supply voltage is provided, via associated reset switches, wherein the method further comprises adjusting, based on the correction value, a control signal for controlling the reset switches, for example a high level of the control signal.

In some implementations of the method, during the calibration mode of operation, the image sensor is exposed to a dark image and/or to a test image. This allows having defined conditions for generating the individual pixel signals with the pixels.

Further embodiments of the method become apparent for the skilled reader from the various embodiments described above for the image sensor system according to the improved concept.

The improved concept will be described in more detail below for several embodiments with reference to the drawings. Identical reference numerals designate signals, elements or components with identical functions. If signals, elements or components correspond to one another in function, a description of them will not necessarily be repeated in each of the following figures.

DETAILED DESCRIPTION

Figure 1:
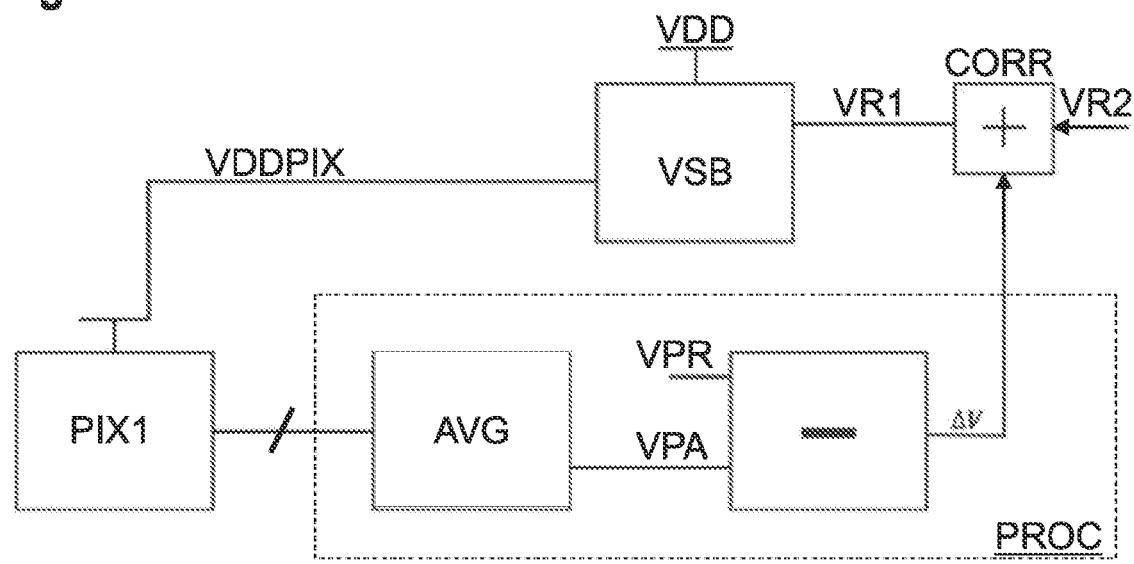
FIG. 1 shows an example implementation of an image sensor system according to the improved concept.

FIG. 1 shows an example implementation of an image sensor system comprising a pixel array PIX1 with a plurality of pixels. The pixel array PIX1 is supplied by a pixel supply voltage VDDPIX. Outputs of the pixels of the pixel array are coupled to a calibration processing block PROC via one or more connections that are shown as a multiplexed connection in this illustration. The pixel supply voltage VDDPIX is provided from a voltage supply block VSB. For example, the voltage supply block VSB is configured to generate the pixel supply voltage VDDPIX from an input voltage VDD based on a first reference voltage VR1, which directly or indirectly determines the voltage level of the pixel supply voltage VDDPIX. The input voltage VDD may be a chip level supply voltage, for example.

The calibration processing block PROC comprises an averaging block AVG coupled to the pixel array PIX1 at its input side and coupled a determination block DET on its output side. On its input side, the determination block DET receives an average pixel signal VPA from the averaging block AVG and further receives a reference pixel signal VPR. At an output, the determination block DET provides a correction value ΔV to a correction processing block CORR. The correction processing block CORR at a further input receives a second reference voltage VR2 and outputs the first reference voltage VR1 to the voltage supply block VSB.

The calibration processing block PROC is configured, in this illustration, using the averaging block AVG, to determine the average pixel signal VPA based on an average of individual pixel signals at the outputs of the pixels of the pixel array PIX1. Furthermore, the calibration processing block PROC is configured, in this illustration using the determination block DET, to determine the correction value ΔV based on the average pixel signal VPA and the reference pixel signal VPR.

The correction processing block CORR is configured to determine a first reference voltage VR1 based on a combination of the second reference voltage VR2 and the correction value ΔV. At startup of the image sensor, e.g. prior to calibration, ΔV may be equal to 0 V to be able to provide an initial voltage supply to the pixels.

The image sensor system of FIG. 1 may contain further circuitry for readout of the pixels of the pixel array PIX1, for example for an image sensing application. It should be noted that also for such applications, the supply of the pixel array PIX1 is performed with the pixel supply voltage VDDPIX, which is dependent on the correction value ΔV in the end.

Figure 2:
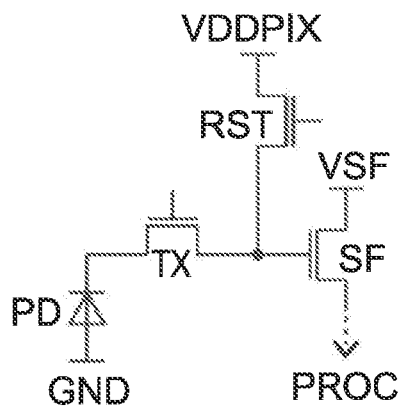
FIG. 2 shows an example implementation of a pixel.

Each of the plurality of pixels of the pixel array PIX1 comprises a photodiode PD, a pixel buffer SF and a transfer gate TX coupled between the photodiode and an input of the pixel buffer SF, as exemplarily illustrated in FIG. 2. For example, the input of the pixel buffer SF is a gate connection of the pixel buffer SF, which may be incorporated as a source follower. An input of the pixel buffer SF may be further connected to a supply terminal, at which the pixel supply voltage VDDPIX is provided, via an associated reset switch RST. The pixel buffer SF itself may be supplied from a buffer supply voltage VSF. In various implementations, the buffer supply voltage VSF may be the same as the pixel supply voltage VDDPIX or may be a different supply voltage like the input voltage VDD. An output of the pixel buffer SF is coupled to the calibration processing block PROC, indicated by the dashed line in FIG. 2. For example, in some implementations of a pixel, a select switch may be present between the output of the pixel buffer SF and the calibration processing block PROC.

In some implementations, the pixel may contain more than one photodiode, which in turn are connected to the input of the pixel buffer SF by respective transfer gates.

In image sensors, for example CMOS image sensors, having such pixels or a pixel array with a plurality of such pixels, a threshold voltage of the pixel buffer SF may vary significantly over corners due to PVT variations. This may cause an output voltage of the pixel to vary substantially because of the PVT variations, in particular at a dark level or a reset level. This may reduce the voltage swing at the output of the pixel and therefore its dynamic range. It is common to process pixel output voltages with analog-to-digital converters, ADCs. If the output voltage swing of the pixels are not well defined, it may be difficult to match it to an input range of the ADC. Hence, an image sensor system as illustrated in FIG. 1, achieves the compensation of the variations of the reset level respectively dark level of each pixel by adjusting the supply voltage VDDPIX of the pixel array PIX1 using a negative feedback loop containing the calibration processing block and the correction processing block, inter alia.

The averaging block receives individual pixel signals at the outputs of the pixels of the pixel array PIX1, forms an average of these individual pixel signals and determines the average pixel signal VPA based thereon. For example, the individual pixel signals are analog-to-digital converted for this process. The individual pixel signals may be dark level signals and/or reset level signals of the pixels of the pixel array. This way the effects of the PVT variations during the dark level, respectively reset level, can be determined more efficiently.

Figure 3:
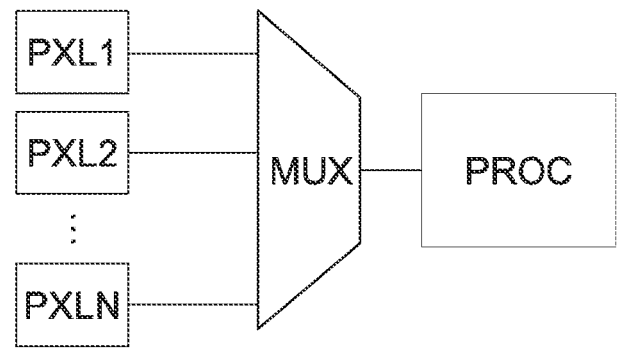
FIG. 3 shows an example implementation of a detail of the image sensor system of FIG. 1.

Referring now to FIG. 3, an example detail of the pixel array and the signal transmission to the calibration processing block PROC is shown. For example, the pixel array comprises the plurality of pixels PXL1, PXL2, ..., PXLN, the output signals of which are provided to the calibration processing block PROC via a multiplexer MUX. Each of the pixels PXL1, PXL2, ..., PXLN provides its individual pixel signal, such that a plurality of individual pixel signals is present at the calibration processing block PROC.

Referring back to FIG. 1, the plurality of individual pixel signals represents for example the output voltage of the plurality of pixels of the pixel array PIX1 subject to PVT variations, which are global variations as well as random mismatch, corresponding to local variations. To reduce the influence of local variations, the average pixel signal VPA is determined by the calibration processing block, in particular by the averaging block AVG. The average, on which the determination of the average pixel signal VPA is based, is for example a mean value, in particular an arithmetic mean value, a median value or a midrange value.

The average pixel signal VPA is then compared to the ideal reference pixel signal VPR. For example, the correction value ΔV determined by the determination block DET corresponds to a difference between the average pixel signal VPA and the reference pixel signal VPR. The correction value ΔV may represent an error voltage. The correction value ΔV is then combined with the second reference voltage VR2 by the correction processing block CORR, for example added to the second reference voltage VR2 in order to determine the first reference voltage VR1. As mentioned above, the first reference voltage VR1 determines a voltage level of the pixel supply voltage VPIX generated by the voltage supply block VSB from the input voltage VDD.

Under nominal conditions, i.e. no PVT variations, the correction value ΔV would be close to zero and the voltage supply block VSB would produce the pixel supply voltage VDDPIX with a level close to the level of the second reference voltage VR2. The average pixel signal VPA would then be equal or close to the reference pixel signal VPR.

Assuming that due to PVT variations, the threshold voltage of the pixel buffer SF is higher than its nominal value, the average pixel signal would consequently be lower than the reference pixel signal VPR. Accordingly, if the correction value ΔV is based on the difference between the reference pixel signal VPR and the average pixel signal VPA, according to $$\Delta V = VPR - VPA,$$

the correction value ΔV will increase, i.e. ΔV>0. This will in turn increase the output voltage VDDPIX of the voltage supply block VSB which will in turn increase the average pixel signal VPA. This negative feedback will continue until the average pixel signal VPA approaches the reference pixel signal VPR.

Similarly, if the threshold voltage of the pixel buffer SF was lower than the nominal value, then the average pixel signal VPA would be higher than the reference pixel signal VPR and the error voltage or correction value ΔV would decrease, i.e. ΔV<0. This will decrease the pixel supply voltage VDDPIX of the pixel array PIX1 such that again the average pixel value VPA would approach the reference pixel value VPR.

In summary, the negative feedback loop will adjust the supply voltage VDDPIX of the pixel array PIX1 to make sure that the average pixel signal VPA is equal to the ideal reference pixel signal VPR. Any change in the threshold voltage of the pixel buffer SF will be compensated by an equal change in the supply voltage.

In some implementations, in particular where the inputs of the pixel buffers are connected to the pixel supply voltage VDDPIX via reset switches RST as is shown in FIG. 2, the correction processing block CORR may be further configured to adjust, based on the correction value ΔV a control signal for controlling the reset switch(es) RST, for example a high level of the control signal.

This may increase the performance of the image sensor system, as a stronger reset pulse may be necessary to pass the larger supply voltage VDDPIX through the reset transistor RST. However, since the amount of voltage that needs to be added or subtracted to the control voltage is the same as for the pixel supply voltage VDDPIX, added complexity is acceptable.

In the above example, only the threshold voltage of the pixel buffer SF has been assumed to be subject to PVT variations. In practice, other parameters may be subject to PVT variations as well, which can be taken into account by the same approach.

Figure 4:
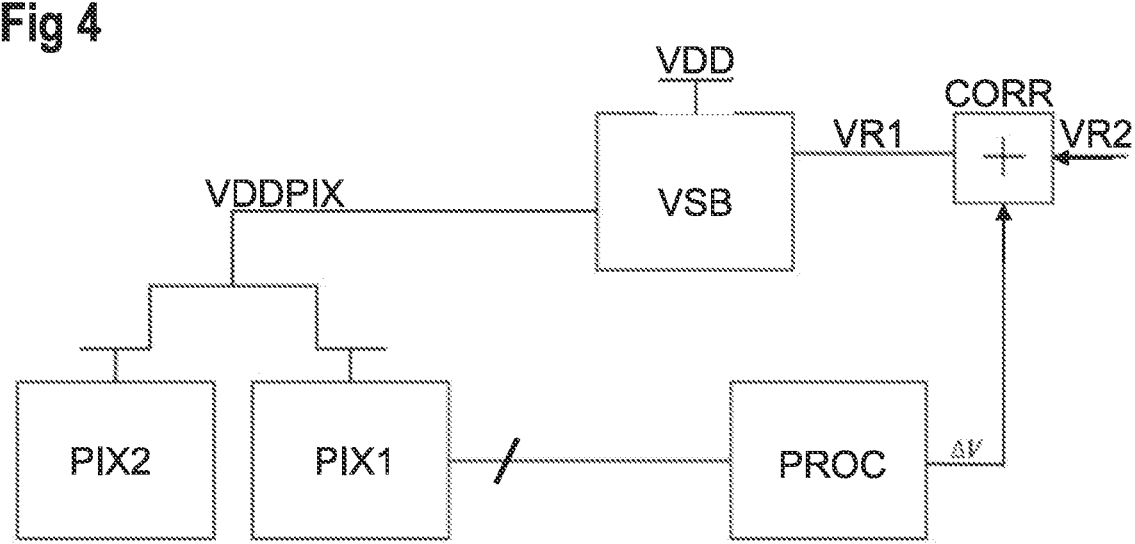
FIG. 4 shows a further example implementation of an image sensor system according to the improved concept.

Referring now to FIG. 4, a further example implementation of the image sensor system is illustrated that is based on the implementation shown in FIG. 1. However, in the implementation of FIG. 4, a further pixel array PIX2 is provided in addition. The further pixel array PIX2 also comprises a plurality of further pixels, wherein each of the further pixels comprises a photodiode, a pixel buffer and a transfer gate coupled between the photodiode and an input of the pixel buffer of the respective further pixel. Like the pixels of the first pixel array PIX1, also the pixels of the second pixel array PIX2 are sensitive to incident light and are particularly configured to sense the incident light. Readout circuitry for the further pixel array PIX2 is omitted in the illustration of FIG. 4 only for reasons of clarity.

In this configuration, the pixel array PIX1 may be a dummy pixel array and the pixels of the dummy pixel array are shielded against incident light. That means that the individual pixel signals provided from the dummy pixel array PIX1 always correspond to dark level signals. Accordingly, the determination of the correction value ΔV is only based on individual pixel signals provided from the shielded pixels. However, the pixel supply voltage VDDPIX is also provided to the further pixel array PIX2, which may be an active pixel array and is subject to the same PVT variations as the dummy pixel array PIX1.

For example, the two pixel arrays PIX1, PIX2 are implemented on the same semiconductor chip using the same process. The adjustment of the pixel supply voltage VDDPIX can therefore be regarded as a calibration of the image sensor system with respect to PVT variations of the pixels of the image sensor system. Such calibration can be implemented to keep track of PVT variations over time. The calibration can be performed at start-up of the image sensor system, every hour or at any other rate desired depending on the rate of change of the PVT variations.

The calibration can also be carried out if triggered by an external signal, for example from some other sensor of the image sensor system which indicates that a PVT variation may have occurred. For example, the feedback loop can be implemented in such a way that is can easily be enabled or disabled. Nevertheless, if the feedback loop is disabled, the determined correction value ΔV is still used for generating the pixel supply voltage VDDPIX.

The calibration can be implemented both on-chip and off-chip, in analog or digital domain. For example, the image sensor system according to the various implementations described, includes an image sensor, which comprises the pixel array PIX1 or both pixel arrays PIX1, PIX2, the voltage supply block VSB and the correction processing block CORR. The image sensor system further includes the calibration processing block PROC that may be integrated with the image sensor, for example on a single chip or together with the image sensor in a single package. Alternatively, the calibration processing block can be provided externally to the image sensor.

Figure 5:
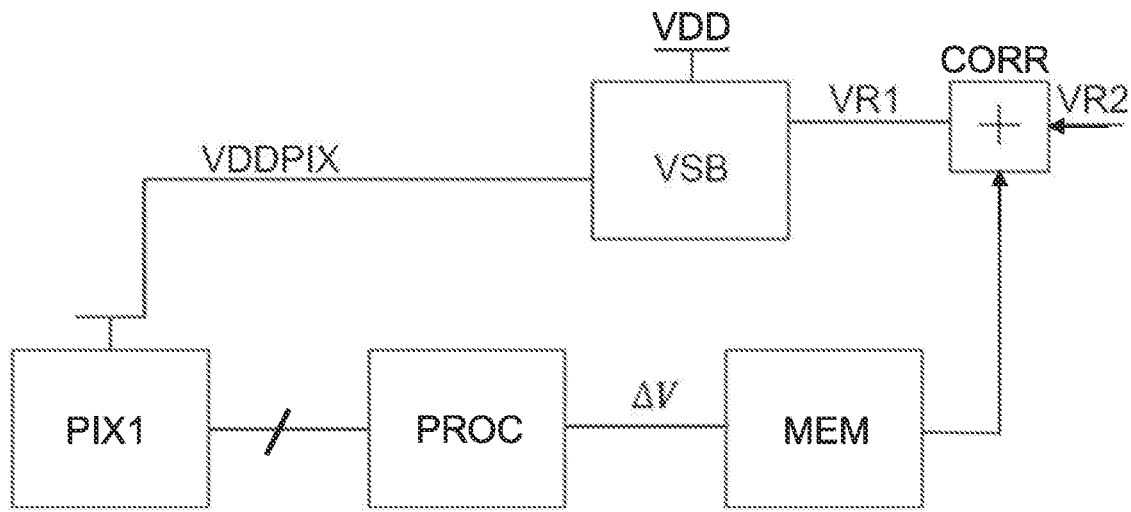
FIG. 5 shows a further example implementation of an image sensor system according to the improved concept.

Referring now to FIG. 5, a further implementation of an image sensor system according to the improved concept is shown that is based on the embodiment illustrated in FIG. 1. Further to the elements described in conjunction with FIG. 1, the image sensor system further comprises a storage element MEM for storing the correction value $\Delta V$. For example, the calibration processing block PROC is configured to store the determined correction value $\Delta V$ into the storage element MEM, and the correction processing block CORR is configured to retrieve the correction value $\Delta V$ from the storage element MEM. The storage element MEM may be some kind of RAM or other volatile memory, for example if the calibration processing block PROC is implemented with the image sensor together in a single chip or in a single package, such that calibration is performed continuously or at specified intervals, as described above.

If the calibration processing block PROC is separate from the image sensor, i.e. the calibration does not take place during regular operation of the image sensor, the storage element may be implemented as a non-volatile memory like an OTP memory or flash memory, which stores the correction value $\Delta V$ once determined by the calibration processing block. During regular operation, the correction processing block CORR retrieves the correction value $\Delta V$ from the OTP or flash memory for setting or adjusting the pixel supply voltage VDDPIX. For example, in such a configuration, the calibration takes place after production of the image sensor in a specific calibration cycle. For example, during such a calibration cycle, the image sensor is exposed to dark images or other test images such that the individual pixel signals evaluated by the calibration processing block PROC correspond to dark level signals. The calibration may take place in an automatic test machine.

The correction value $\Delta V$ may be stored in the memory MEM as a multi-bit value, for example with 3 to 10 bits, without excluding other bit lengths of the correction value $\Delta V$.

It should be apparent to the skilled reader that the provision of a storage element MEM described in conjunction with FIG. 5 may also be combined with the implementation of the image sensor system shown in FIG. 4.

In the various implementations described above, the image sensor system may further comprise an analog-to-digital converter, ADC, which is coupled to outputs of the pixels of the pixel array(s) PIX1 and/or PIX2. The reference pixel signal VPR may be dependent on an input characteristic of the ADC, for example an input voltage range of the ADC. Hence, the output swing of the pixels of the pixel arrays PIX1 and, if available, PIX2, can be matched to an input voltage range of the ADC by adjusting the reference pixel signal VPR and the reference voltage VR2 for the voltage supply block VSB in the feedback loop.

Generally speaking, with the improved concept of the present disclosure, an average reset level of the pixels can be held at a constant predefined value, despite any PVT variations.

This may preserve the inherent voltage swing provided by the full well capacity, FWC, of the pixels. This may further allow optimizing the full well of the pixels.

If the output swing of the pixels is matched to the input voltage range of the ADC, a column amplifier used in conventional image sensors can be left out.

Figure 6:
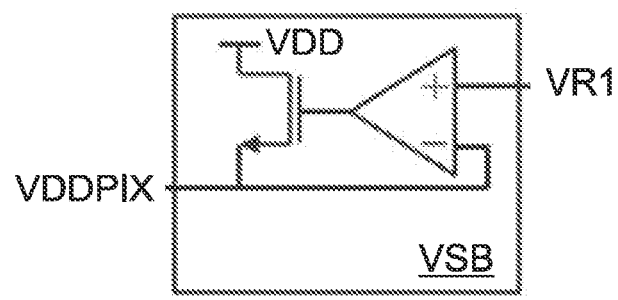
FIG. 6 shows an example implementation of a voltage supply block.

FIG. 6 shows an example implementation of a voltage supply block VSB that is implemented as a low dropout regulator, LDO, in this example. An output transistor is connected between a terminal for receiving the input voltage VDD and an output terminal for providing the pixel supply voltage VDDPIX. The transistor is controlled by a differential amplifier receiving the first reference voltage VR1 as a reference voltage and controlling the output voltage, which is the pixel supply voltage VDDPIX to the first reference voltage VR1.

It should be apparent to the skilled reader that other, more sophisticated implementations of LDOs or even other implementations of voltage supplies can be used alternatively for generating the pixel supply voltage VDDPIX from the reference voltage VR1.

An image sensor system according to one of the implementations described above or an image sensor without the calibration processing block PROC implemented on-chip can be used in camera systems. For example such camera systems may be included in various electronic devices.

Such electronic devices may include smartphones, tablet computers, portable computers and the like, but also larger devices such as personal computers and/or their displays. Electronic devices further include photo or video cameras and smart watches and other wearables.

The invention claimed is:

1. An image sensor system comprising
a first pixel array with a plurality of first pixels, each of the first pixels comprising a first photodiode, a first pixel buffer, and a first transfer gate coupled between the first photodiode and an input of the first pixel buffer, wherein the first pixel array is a dummy pixel array and pixels of the dummy pixel array are shielded against incident light;
a second pixel array with a plurality of second pixels, each of the second pixels comprising a second photodiode, a second pixel buffer, and a second transfer gate coupled between the second photodiode and an input of the second pixel buffer of the respective second pixels and being configured to sense the incident light;
a voltage supply configured to generate a pixel supply voltage from an input voltage based on a first reference voltage and to provide the pixel supply voltage to the dummy pixel array and to the second pixel array;
a calibration processor configured to determine an average pixel signal based on an average of individual pixel signals at outputs of the pixels of the dummy pixel array and to determine a correction value based on the average pixel signal and a reference pixel signal; and
a correction processor configured to determine the first reference voltage based on a combination of a second reference voltage and the correction value.

2. The image sensor system according to claim 1, further comprising a storage element, wherein the calibration processor is configured to store the determined correction value into the storage element, and wherein the correction processor is configured to retrieve the correction value from the storage element.

3. The image sensor system according to claim 1, wherein the individual pixel signals are dark level signals and/or reset level signals of the pixels of the dummy pixel array.

4. The image sensor system according to claim 1, wherein the inputs of the pixel buffers of the dummy pixel array and the second pixel array are connected to an array supply terminal, at which the pixel supply voltage is provided, via associated reset switches.

5. The image sensor system according to claim 4, wherein the correction processor is further configured to adjust, based on the correction value, a control signal for controlling the reset switches, in particular a high level of the control signal.

6. The image sensor system according to claim 1, further comprising an analog-to-digital converter, ADC, which is coupled to outputs of the pixels of the dummy pixel array, wherein the reference pixel signal is dependent on an input characteristic of the ADC, in particular an input voltage range of the ADC.

7. The image sensor system according to claim 1, wherein the average, on which the determination of the average pixel signal is based, is one of the following:
   a mean value, in particular an arithmetic mean value;
   a median value;
   a mid-range value.

8. The image sensor system according to claim 1, which includes an image sensor, which comprises the dummy pixel array, the second pixel array, the voltage supply and the correction processor, and which further includes the calibration processor being integrated with the image sensor or being provided externally to the image sensor.

9. An electronic device with a camera system comprising an image sensor system according to claim 1.

10. A method for operating an image sensor, the image sensor comprising
   a first pixel array with a plurality of first pixels, each of the first pixels comprising a first photodiode, a first pixel buffer and a first transfer gate coupled between the first photodiode and an input of the first pixel buffer, wherein the first pixel array is a dummy pixel array and pixels of the dummy pixel array are shielded against incident light;
   a second pixel array with a plurality of second pixels, each of the second pixels comprising a second photodiode, a second pixel buffer, and a second transfer gate coupled between the second photodiode and an input of the second pixel buffer of the respective second pixels and being configured to sense the incident light; and
   a voltage supply configured to generate a pixel supply voltage from an input voltage based on a first reference voltage and to provide the pixel supply voltage to the dummy pixel array and the second pixel array;

the method comprising during a calibration mode of operation, determining an average pixel signal based on an average of individual pixel signals at outputs of the pixels of the dummy pixel array and determining a correction value based on the average pixel signal and a reference pixel signal; and determining the first reference voltage based on a combination of a second reference voltage and the correction value.

11. The method according to claim 10, wherein, during the calibration mode of operation, the correction value is stored into a storage element of the image sensor, and wherein determining the first reference voltage comprises retrieving the correction value from the storage element.

12. The method according to claim 10, wherein the individual pixel signals are dark level signals and/or reset level signals of the pixels of the dummy pixel array.

13. The method according to claim 10, wherein the inputs of the first pixel buffer of the dummy pixel array and the second pixel buffer of the second pixel array are connected to an array supply terminal, at which the pixel supply voltage is provided, via associated reset switches, and wherein the method further comprises adjusting, based on the correction value, a control signal for controlling the reset switches, in particular a high level of the control signal.

* * * * *